United States Patent [19]

Briggs, Jr. et al.

[11] 4,273,966

[45] Jun. 16, 1981

[54] TERMINAL APPARATUS FOR TELECOMMUNICATIONS LINES

[75] Inventors: Paul R. Briggs, Jr., Andover; Louis J. Scerbo, Succasunna, both of N.J.

[73] Assignee: Bell Telephone Laboratories, Incorporated, Murray Hill, N.J.

[21] Appl. No.: 79,063

[22] Filed: Sep. 26, 1979

[51] Int. Cl.³ .............................................. H04Q 1/14
[52] U.S. Cl. .................................... 179/98; 361/426; 339/198 R
[58] Field of Search .................... 179/98, 91 R, 1 PC; 361/425–431; 339/18 R, 198 R, 198 H

[56] References Cited

U.S. PATENT DOCUMENTS

| | | | |
|---|---|---|---|
| 3,420,381 | 1/1969 | Bradfield | 361/429 |
| 3,780,351 | 12/1973 | Salmon et al. | 179/98 |
| 3,947,732 | 3/1976 | Cwirzen | 179/98 |
| 4,012,096 | 3/1977 | DeLuca et al. | 361/425 |
| 4,037,910 | 7/1977 | Paluch | 179/98 |
| 4,197,434 | 4/1980 | Inamasu et al. | 361/428 |
| 4,202,029 | 5/1980 | Voshikawa et al. | 361/426 |

Primary Examiner—Gerald L. Brigance
Attorney, Agent, or Firm—Robert O. Nimtz

[57] ABSTRACT

An electrical terminating arrangement (100) serving as an interconnection juncture for joining central office equipment with outside plant facilities, an access point for testing and a protection provisioning point comprises connector apparatus (402), tie cabling (500) and protector apparatus (110) wherein the conventional stand-alone test field appearance is eliminated. Test access is provided directly through sockets (130) in front face (113) of protector apparatus (110), or indirectly to test lands through apertures (403) in protector device (400) inserted in sockets (130). Reliability is achieved by utilizing connector (170) to couple protector apparatus (110) to a mated connector on the outside plant stub cable. Installation complexity is reduced by employing snap-in details (190) as well as plug-in details.

18 Claims, 6 Drawing Figures

TERMINAL APPARATUS FOR TELECOMMUNICATIONS LINES

BACKGROUND OF THE INVENTION

1. Field of the Invention

This invention relates generally to electrical terminal apparatus and, more particularly, to connector-protector apparatus for use on a modular main distribution frame system in a telephone central office.

2. Description of the Prior Art

The main distribution frame system in a telephone centrl office is the focal point of many work activities and the system serves many diverse purposes, such as: interconnection juncture for joining central office equipment with outside plant facilities; access point for testing into or out of the central office; and protection provisioning interface. Thus, in a functional sense, the frame system provides for connection, testing and protection. Physically, in conventional frame systems, separate apparatus serve each function.

Modular main frame systems have decreased craftsperson activity and reduced frame administration time by supplanting earlier frame systems which typically required a two-person team to run jumpers and necessitated cumbersome frame administration procedures.

In a modular frame system, outside plant pairs first appear on protector apparatus and terminate on connector apparatus; also, central office equipment terminates on connecting blocks similar to the connector apparatus. Oftentimes, the connector and protector apparatus are located on separate, spaced-apart frames which facilitate administration procedures and craftsperson activity but impose a concomitant increase in floor space requirements. Electrical interconnection of an outside plant wire to a central office equipment terminal comprises a series path including a protector device and a so-called jumper connection. The protection device is inserted into a protector panel which forms a component of the protector apparatus; the device generally provides series as well as shunt protection against excessive voltage and current appearing on the series path. Access to outside plant facilities for protected testing is effected from a separate, stand-alone test field appearance which bridges the series interconnection path. Unprotected testing into either the outside plant or central office may be effected at the protector panel whenever the protector device is removed.

U.S. Pat. No. 4,057,692, issued to DeBortoli et al on Nov. 8, 1977, is representative of prior art central office terminal apparatus in which three separate fields, namely, connector, protector and test, are readily identified. DeBortoli et al disclose the typical arrangement wherein an outside plant stub cable is directly wire-wrapped to the outside plant side of protector panel sockets which seat the protector device. Bridging jumpers connect test points in the test field to the outside plant stub cable appearances on the sockets. The connector field serves as an interconnection point for outside plant and central office equipment leads. Backplane wiring furnishes the jumper connections that link the connector field with sockets on the protector panel associated with central office side of the protector socket. Protector devices are guided and held in place with wall-type dividers. The walls have apertures which mate with corresponding projections on the protector to provide full-seated or so-called detent positioning.

Another example of modular terminal apparatus is disclosed in U.S. Pat. No. 4,012,096, issued to DeLuca et al on Mar. 15, 1977. In this design the three standard fields are also discernible. In addition, both the ouside plant stub cable and the outside plant cross-connect terminal field leads are wire-wrapped to pin couplets that appear side-by-side on the connector face. Interconnection is effected with shorting plugs having metal receptacles which mate with the pin couplets. It is alluded to, but not disclosed, that the plugs may be adapted to provide protection. Separate test field appearances of the cable pairs are provided by bridging to the connector appearances of the pairs.

While terminal apparatus of these types do suffice for the intended purposes of connection, protection and testing, they also exhibit shortcomings. One severe shortcoming is that the stand-alone appearance of the test field results in oversized apparatus with the concomitant excessive use of frame area. Related shortcomings are the additional production and material costs associated with providing a separate test field. A further disadvantage lies in the labor-intensive installation procedures, particularly the time-consuming effort devoted to wire-wrapping sockets or pins.

SUMMARY OF THE INVENTION

The foregoing shortcomings, limitations and deficiencies in prior art terminal apparatus are precluded with the present invention of improved terminal apparatus: which decreases apparatus size by eliminating the separate, stand-alone test field appearance and, therefore, requires only stand-alone connector and protector fields; and which facilitates on-site installation with the use of mated connectors and snap-in details.

The terminal apparatus in accordance with the present invention generally comprises the following three interrelated assemblies: (a) connector apparatus which terminates the outside plant cross-connect leads and provides means for interconnecting to central office equipment; (b) protector apparatus comprising: a protector panel for seating protector devices, each of these devices providing means for electrical test accessing of an outside plant pair with the use of external probing means; at least one connector, linked to a plurality of outside plant panel appearances, which mates with a corresponding connector terminating the outside plant stub cable; and means for mounting on the protector panel those connectors associated with the outside plant pairs; and (c) means for electrically joining the connector and protector apparatus.

Broadly speaking, in the preferred embodiment of the present invention, the protector and connector apparatus are located in back-to-back fashion on a single, two-sided modular frame. The connector apparatus preferably comprises a connector block that snaps into the modular frame and interconnects to central office equipment leads with clip-type terminals having wire guides that minimize wire fatigue. The protector apparatus comprises: a protector panel with groups of sockets mounted in laterally disposed panel apertures; protector devices inserted in socket groups, each protector device providing protection against overvoltage and overcurrent conditions and adapted to provide test lands internal to the protector housing which are accessible through holes in the housing using external probing means; a multiple-receptacle connector that couples to a correspondingly mated pronged connector to electrically link the stub cable to the panel apparatus; and a bracket, snap-mounted on the protector panel, that includes snap-in retainers for holding the panel connectors. A tie cable electrically joins a plurality of terminals on the connector block appearances, which represent outside plant to preselected outside plant appearances on the protector apparatus.

The terminal apparatus disclosed herein is part of a newly devised modular frame system which eliminates the independent appearance of the test field and facilitates installation and maintenance of the modular components to improve system reliability. One protector device which combines the protection as well as testing function into a single safety module is the subject matter of U.S. patent application Ser. No. 78,961, filed on even date herewith by A. R. Montalto, L. J. Scerbo and J. P. Starace. Another protector device serving the protection and testing functions is disclosed in U.S. patent application Ser. No. 79,064, filed on even date herewith, by R. M. Bulley. Test accessing tools which provide either one-at-a-time or multiple access to these protector devices are disclosed in U.S. patent application Ser. No. 78,960, filed on even date herewith by A. R. Montalto, L. J. Scerbo and J. P. Starace.

One feature of the terminal apparatus implemented in accordance with the present invention is that on-site installation procedures and electrical connections are facilatated via snap-in and plug-in mechanisms, respectively, and effect efficient and reliable installation activities.

Other features and advantages of the present invention will be apparent hereinafter from a detailed description of the invention and the appended claims taken in conjunction with the attached drawing of an illustrative embodiment.

BRIEF DESCRIPTION OF THE DRAWING

FIG. 6 is a perspective view of an illustrative embodiment of a tool utilized to disengage the protector panel from the frame mounted retainers.

DETAILED DESCRIPTION

Figure 1:
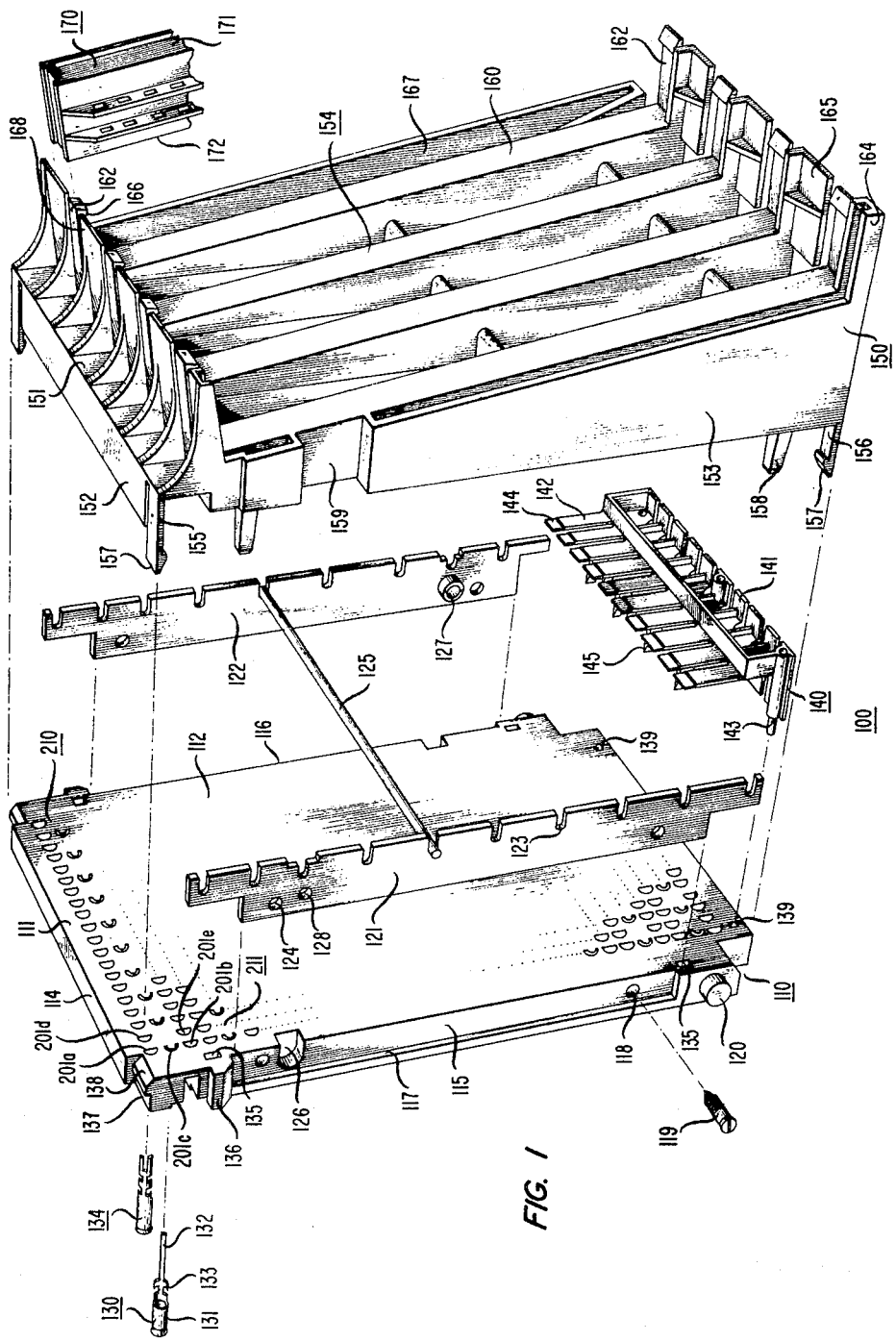
FIG. 1 is an exploded perspective view of the protector apparatus, as viewed from the back of the protector panel, displaying the mechanical elements comprising the protector apparatus.

The specific example of terminal apparatus described by way of illustration comprises: protector apparatus 100 shown in exploded perspective view in FIG. 1; connector apparatus 402 of the type best illustrated by U.S. Pat. No. 3,899,237, which is incorporated herein by way of reference; and tie cabling 500 linking connector and protector apparatus. Interconnection of these major components to form the illustrative embodiment of the present invention is shown pictorially in FIG. 2.

In the detailed description, attention is first focused on mechanical construction of the terminal apparatus. The electrical description is then presented, although some interweaving of this discussion with the mechanical description is provided for lucidity.

1. MECHANICAL CONSTRUCTION

The protector apparatus 100 illustrated in FIG. 1 includes insulative protector panel 110, fanning strip 140, insulative bracket 150 and connector 170.

Insulative panel 110 includes a thin, rectangularly-shaped body 111 which may, for example, be injection-molded from a high impact, fire retardant, polycarbonate, thermoplastic resin. This material provides necessary strength to insure that panel 110 can withstand undue stresses caused by shear and flexing forces to which the main distribution frame is subjected. The major portions of back face 112 and front face 113 (see FIG. 3) have laterally displaced apertures disposed between the faces. The apertures are arranged in groups of five. To accommodate a 100-pair stub cable(not shown), the groups are further arranged in a 10-by-10 matrix-like grid. The topmost row, near top edge 114 as viewed from back face 112, contains groups designated 201 through 210, the adjacent row 211 through 220, and so on. Within each group the apertures are arranged in two vertical columns and three horizontal rows. For example, in group 201, apertures 201a, 201c and 201b lie in the first column and the first, second and third rows, respectively. In the second column, apertures 201d and 201e lie in the first and third rows, respectively. Apertures 201a and 201b are associated with preselected central office equipment leads (not shown), whereas apertures 201d and 201e correspond to a predetermined incoming cabe pair (not shown). Aperture 201c is associated with ground.

Figure 3:
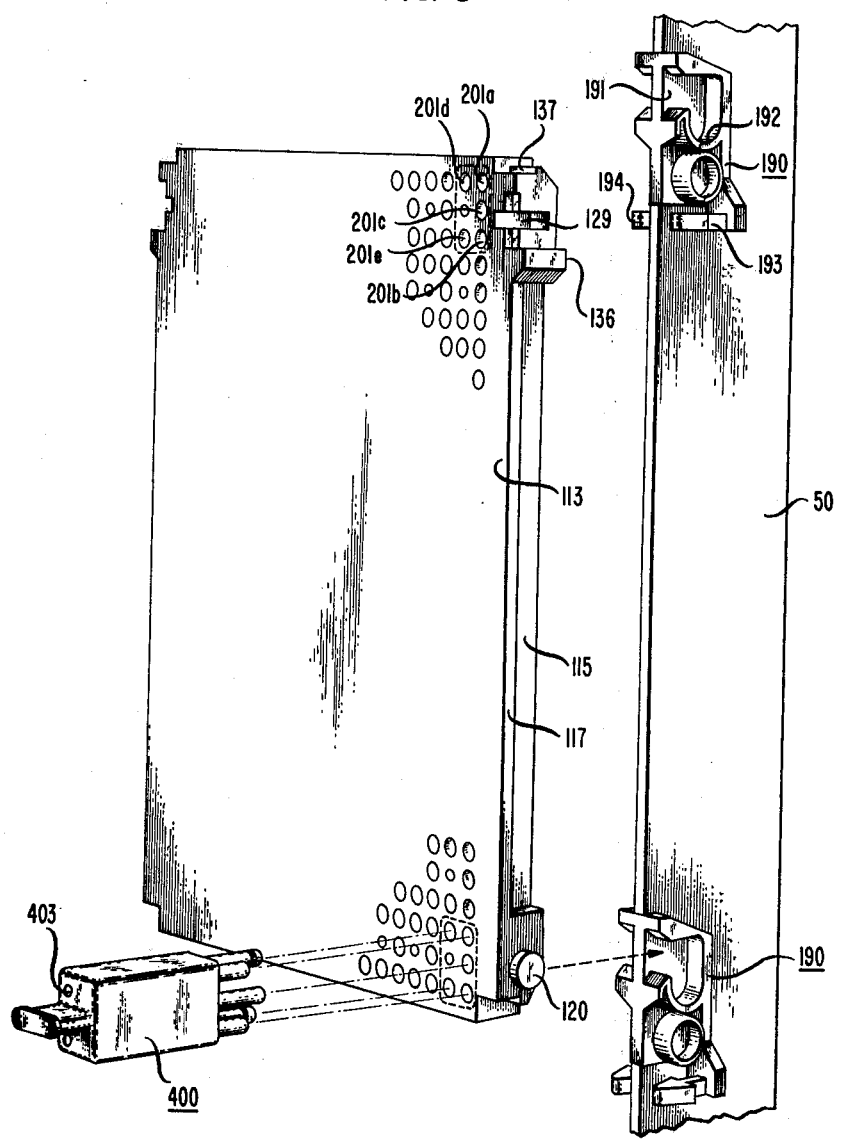
FIG. 3 is a frontal perspective view of the protector panel showing one form of protector device, adapted for electrical test accessing, inserted in a socket group.

Formed integrally with body 111, near the bottom of left and right side walls 115 and 116, respectively, are protruding, circular hubs 120. As shown in FIG. 3, hubs 120 slide into bottom retainers 190 mounted on frame 50. Top retainers 190 hold the two corners of panel 110, near top edge 114, firmly in place. Panel 110 may be rotated on an axis through hubs 120 in an arc of approximately 180 degrees. In the normal operating position, front face 113 is exposed to receive protector devices 400. To gain access to the back of panel 110 for work activities, top retainers 190 are disengaged and panel 110 is rotated from the upright, folded position with front face 113 exposed to the inverted, unfolded position with back face 112 exposed.

Referring again to FIG. 1, a portion of each of side walls 115 and 116 is recessed to form lip 117 running longitudinally along the side walls near front face 113. The recessed portion of side walls 115 and 116 is adapted to receive elongated, metallic ribs 121 and 122, respectively, each rib being oriented in top-to-bottom fashion along the edge of panel 110 and abutting corresponding lip 117. Formed in ribs 121 and 122 are a plurality of indents 123 which are equally spaced apart along the top edge of each rib. To facilitate assembly, polarizing nub 127, affixed to each rib with fastener 128, fits into notch 126 formed in the sidewalls of body 111. Notch 126 in sidewall 115 is located near top edge 114, whereas notch 126 in sidewall 116 is located near the bottom edge. Apertures 124 in ribs 121 and 122 are employed to affix the ribs to body 111 with screws 119, which seat in threaded apertures 118.

A plurality of electrically conductive bars 125 are horizontally disposed between correspondingly aligned indents 123 in ribs 121 and 122. Each end of bar 125 fits into indent 123 and is soldered in place. A conductive strap 401 (see FIG. 2) between rib 121 and central office ground insures that ribs 121, 122 and bars 125 are at ground potential.

Using aperture group 201 as exemplary since all other groups are identical, each aperture 201a–201e has a circular diameter when viewed from front face 113 whereas 201a,b,d,e are semicircularly-shaped and 201c is arc-shaped when viewed from back face 112. Each circular diameter extends almost through body 111 where it meets either the semicircular-shaped or arc-shaped portion to form a seat at their juncture.

Sockets 130 seat in apertures 201a, 201b, 201d and 201e, whereas socket 134 seats in aperture 201c. Socket 130 is typically formed from a solid sheet of conductive material and has circular, receptacle end 131 and solid, pin-like end 132. Curved, wing-like protuberances 133 emanate from socket 130 intermediate its ends and are shaped similarly to the semicircular portions of the aperture to allow passage of wings 133 through body 111. Initially, the radius of curvature of wings 133 is about the same as the radius of circular end 131. To install socket 130, end 132 is inserted through front face 113 and urged towards back face 112. Pin end 132 and wings 133 pass from the circular to semicircular portion of the apertures and finally circular end 131 comes to rest on the internal seat with end 132 and wings 133 projecting beyond back face 112. Installation is completed by flattening the wings to remove the radius of curvature and thereby preclude lateral movement of socket 130. In this final position, circular end 131 is generally countersunk in relation to front face 113.

Socket 134 fits into aperture 201c to couple ground to an inserted protector device. Socket 134 is similar to socket 130 except that the pin end is soldered to the appropriate ground bar 137 which is aligned to pass horizontally through the middle row of the groups.

Insulative bracket 150 generally comprises: thin, rectangularly-shaped base 151; fin 152 projecting transversely from the similar dimensional sides of base 151; triangularly-shaped side member 153 extending along the left side of base 151; snap-in retainer assemblies 154 disposed on the top surface 151; and standoffs 158 and clips 155, 156 having hook ends 157. Members 151 through 158 may, for example, be formed as an injection-molded unit from thermoplastic resin.

Pairs of clips 155 and 156, being located at the two upper and two lower corners, respectively, of base 151, project transversely to base 151. Each end of clips 155 and 156 has hook 157 formed therewith. In addition, each corner of body 111 is cut away to form ledge 137 having triangularly-shaped barb 138 formed thereupon. To mount bracket 150 on panel 110, clips 155 and 156 are initially positioned proximate to ledges 137 and bracket 150 is urged towards panel 110. Clips 155 and 156 flex as hooks 157 climb barbs 138 and, finally, hooks 157 grasp barbs 138 to form a securely fastened connection. As an aid to establishing and stabilizing the spaced-apart relation of bracket 150 with panel 110, standoffs 158 slip into correspondingly aligned top and bottom guides 135 formed as recesses in body 111.

Each of the four retainer assemblies 154 comprises: rib 160 running longitudinally on the back surface of base 151; flex fingers 162 located at the top and bottom ends of ribs 160; and reinforced guide members 164 and 165 adjacent the leftmost and three remaining assemblies 154, respectively. Ribs 160 are pitched at an acute angle relative to base 151 so that the angle between the plane of base 151 and the plane containing the top surfaces of all ribs 160 is about 20 degrees as viewed from side member 153 with the point of intersection of the planes proximate to fin 152. Each flex finger 162 projects vertically from the plane containing the top surfaces of ribs 160 and has inwardly directed catch 166 at its free end. Each pair of vertically aligned fingers 162 serves to grasp and hold individual connectors 170 vertically in place. Connector 170 is pressed into place by sliding it along guide wall 164 or 165 so as to bend finger 162 until catch 166 grasps the top and bottom of surface 171 and undersurface 172 rests on rib 160.

Figure 4:
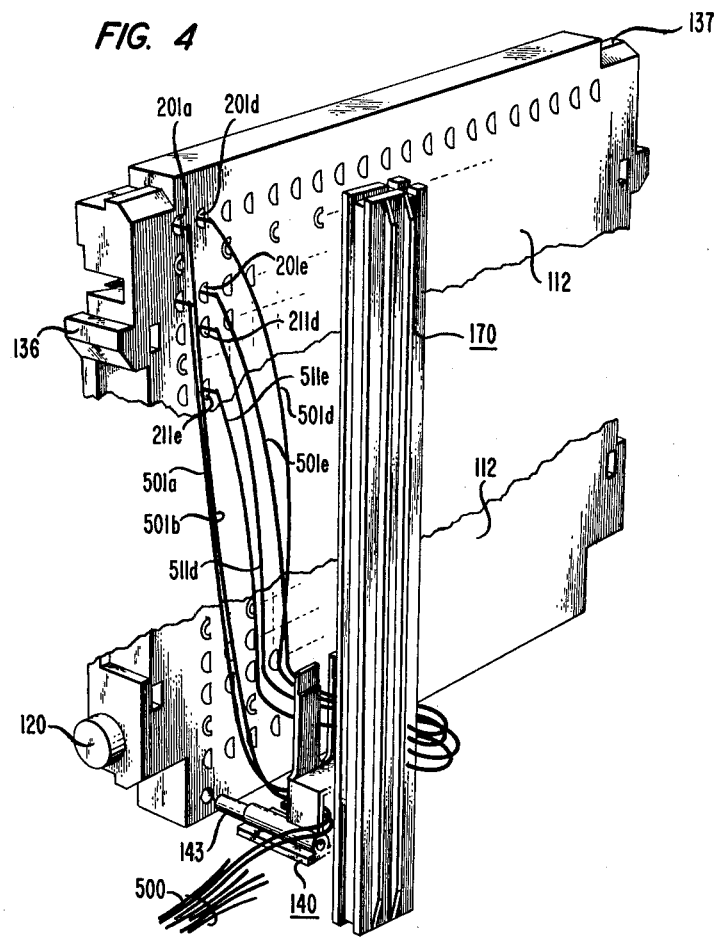
FIG. 4 is a partially cutaway perspective view of the protector apparatus as viewed from the back of the protector panel with the connector disengaged from the retainers to display backplane wiring.

Recess 159 in triangular member 153 routes grounding strap 401 (see FIG. 2) between protector apparatus 100 and external ground. Fin 152 and the portion of triangular member 153 that extends laterally beyond base 151, as well as similarly extending portion (not visibly apparent) from right-side member 167 overhang body 111 to shield backplane wiring (see FIG. 4) from damage.

Connector 170 is one connector of an arrangement having a complementary mate attached to the outside plant stub cable (not shown). Connector 170 with its mate effectuate an efficient and reliable interconnection of protector apparatus 100 to the outside plant facilities. Examples of such a mated connector arrangement are given in U.S. Pat. Nos. 3,772,635 and 3,858,158, which are incorporated herein by way of reference. Abutments 168 facilitate manipulation and final positioning of the mates to connectors 170.

Fanning strip 140, interposed between bracket 150 and panel 110, has an elongated, thin, flexible, insulative comb-like body member 141 and comb-like projections 142 disposed transversely to body 141 along the longer dimensional edges. The open regions between comb projections of body 141 and combs 142 effect orderly routing of backplane wiring to reduce congestion and wire fatigue, as will be discussed shortly. Fanning strip 140 has stanchions 143 which seat in panel apertures 139 so as to maintain strip 140 in place. In addition, the bottom edge of base 151 rests on ridges 144 formed at the ends of combs 142 so as to preclude lateral motion of strip 140. Comb projection 145, transverse to combs 142, also aids in routing backplane wiring.

Figure 5:
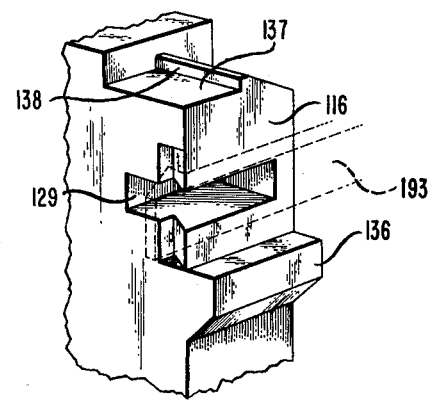
FIG. 5 is a cutaway perspective view of an upper corner of the protector body depicting the frame mounted retainer securing the protector panel in its upright position.

Prior discussion concerning retainers 190 (see FIG. 3) alluded to its dual function of serving two vertically aligned panels 110. Each retainer 190 comprises identical halves arranged in vertical, mirror-image relation. The upper portion of each half, including passageway 191 and semicircular well 192, seats hub 120 of a first panel 110. The lower portion of each half, including laterally disposed flexible finger 193 having hook 194 at the free end, grasps another panel 110 located immediately below the first panel 110. FIG. 5 depicts the upper right-hand corner of face 113 with finger 193, shown dashed, straddling T-shaped recess 129, which is formed in body 111, and grasping front face 113 with hook 194. The combination of hub 120 being constrained in well 192 and front face 113 being grasped by finger 193 effects a secure mounting of protector apparatus 100 to frame 50.

Retainer 190 has opposing, triangularly-shaped barbs, one on the back surface of each retainer half, which snap into apertures (not shown) in frame 50 thereby providing an effective, nonfastener-type mounting.

To disengage finger 193 from its grasp on panel 110, fork-like tool 410, depicted in FIG. 6, is utilized. Tapered tip 412 of prong 411 is inserted, with the aid of handle 413, into T-shaped recess 129 in order to bend finger 193 and pry loose hook 194 from front face 113. Panel 110 is now free to rotate, in conjunction with tool 410, about hubs 120 to release panel 110 from its upright, engaged position. Laterally extending, protruding guide bar 136 facilitates manipulation of tool 410 by slidably guiding tine 414.

2. ELECTRICAL INTERCONNECTION

Four 25-receptacle connectors 170 serve the 10-by-10 grid of socket groups. To connect the outside plant side of a socket group to a connector, jumper wires are employed. For example, with reference to FIG. 4, socket ends 132 in aperture pair 201d,201e are wire-wrapped with one end of jumper pair 501d,501e, respectively, and the other jumper ends are electrically joined to leftmost connector 170. Similarly, sockets ends 132 in aperture pair 211d,211e are jumpered with wires 511d,511e to the next receptacle position. Wired completely in this manner, eight columns of socket groups are dedicated to a single connector whereas two columns are split between two connectors. Fanning strip 140, via combs 142, divides the 100 pairs of jumpers into approximately equal-sized bundles for orderly routing and ridges 144 in conjunction with base 151 form a loop-back point for the backplane wiring to separate layers of wiring as well as facilitating foldout.

To connect the central office equipment side of a socket group to connector apparatus 402 (see FIG. 2), tie cable 500 is employed. For example, socket ends 132 in aperture pair 201a,201b are wire-wrapped with one end of wire pair 501a,501b, respectively, and the other end of the wire pair is electrically linked to lug-type terminals on connector apparatus 402. When wired completely in this manner, fanning strip 140, via combs 141 and 145, partition the 100 pairs of wires composing tie cable 500 into approximately equal-sized bundles.

Figure 2:
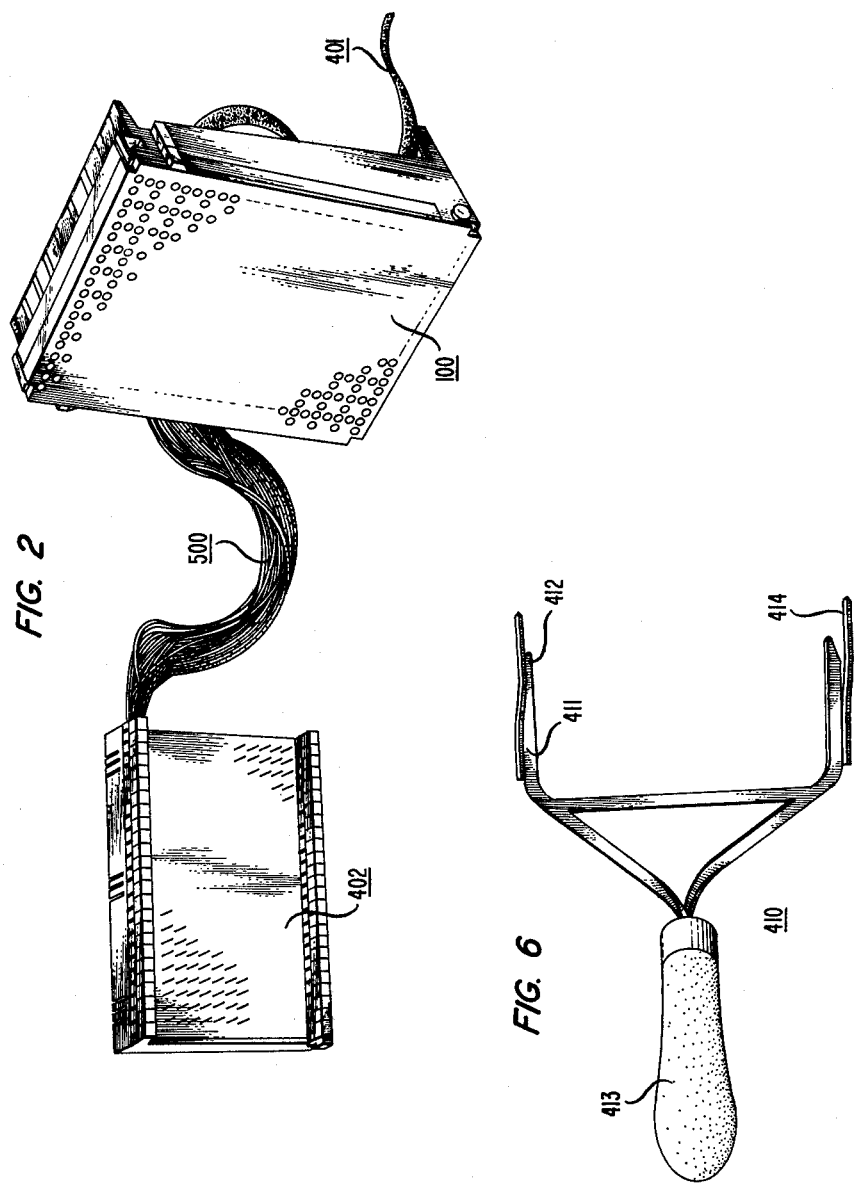
FIG. 2 is a pictorial view of the terminal apparatus including connector and protector apparatus interconnected with tie cabling.

Thus, as shown in FIG. 2, completely factory assembled and wired apparatus comprising protector panel 100, connector apparatus 402 and tie cable 500 are provided for on-site installation which requires essentially snap-in and plug-in operations for installation.

The final electrical link between outside plant facilities appearing on connector 170 and central office equipment appearing on connector apparatus 402 is provided by protector devices 400. Two series paths internal to one device 400 connect, for example, wires 501a to 501c and 501b to 501d. Two apertures 403 in the housing of each device 400 furnish access for electrically testing these series paths in the briding mode. A test field is created whenever a plurality of devices 400 are inserted in panel 110. It is often desirable to furnish sockets 130 mounted in the outside plant aperture pair (for example, 201d, and 201e), with ring-like constrictions in end 132 so that protector device 400 may be half-seated in panel 110. In this so-called detent position, access to the outside plant pair in a protected mode is provided by device 400, but the connection between outside plant and central office equipment is broken.

It will be further understood that the terminal apparatus herein described are not limited to specific forms disclosed by way of example and illustration, but may assume other forms, materials or dimensions limited only by the scope of the appended claims.

We claim:

1. A prefabricated modular main frame interconnection panel for interconnecting outside plant wires with central office equipment leads, said panel comprising
    means for receiving protector devices on one face of said panel, said receiving means including electrical terminals accessible through the opposite face of said panel,
    connector means for terminating said wires,
    jumper means for joining said connector means to a first grouping of said terminals, said equipment leads terminating on a second grouping of said terminals, and
    means for rotatably snap-mounting said panel into said main frame.

2. The modular panel according to claim 1 wherein said protector devices include accessible test lands.

3. Main frame terminal apparatus for interconnecting outside plant wires terminating in a first connector with preselected central office equipment leads comprising in combination:
    first means for terminating said leads;
    second means adapted to receive said first connector; and
    means for electrically joining said first and second means
    characterized in that said second means comprises
        insulative means having a plurality of first and second apertures,
        electrically conductive, receptacle means mounted in said apertures,
        retainer means mounted on said insulative means,
        a second connector, mounted in said retainer means, for receiving said first connector, and
        means for electrically interconnecting said receptacle means mounted in said plurality of first apertures with said second connector; and
    wherein said electrical joining means links said first means with said receptacle means mounted in said second apertures.

4. Main frame terminal apparatus for interconnecting outside plant wires terminating in a first connector with preselected central office equipment leads comprising in combination
    connector apparatus for terminating said central office equipment leads,
    protector apparatus adapted to receive said first connector,
    means for electrically joining said connector apparatus with said protector apparatus
    characterized in that said protector apparatus comprises
        a panel having a front face, a back face and groups of apertures disposed between said front face and said back face, each said group including a pair of outside plant apertures and a pair of central office equipment apertures,
        electrically conductive sockets mounted in said apertures, each of said sockets having a receptacle end and a terminal end,
        a bracket having means for mounting said bracket on said back face and including at least one retainer pair, each retainer of said pair disposed on oppositely-faced edges of said bracket, a second connector, adapted to mount in said at least one retainer pair, for receiving said first connector, and means for electrically interconnecting said terminal ends of said sockets mounted in said pair of outside plant apertures with said second connector; and wherein said electrical joining means links selected pairs of said central office equipment leads terminating on said connector apparatus with said terminal ends of said sockets mounted in a plurality of said central office equipment apertures.

5. The terminal apparatus in accordance with claim 4 wherein each of said groups of apertures further includes a ground aperture, and said protector apparatus further comprises ground sockets mounted in said ground apertures, each of said ground sockets having a receptacle end and a terminal end, and a ground structure mounted on said back face and electrically connected to each said terminal end of said ground sockets.

6. The terminal apparatus in accordance with claim 5 for mounting on said frame wherein said first connector is a plug-type connector, said second connector is a receptacle-type connector adapted to mate with said plug connector, said terminal end of each of said conductive sockets is pin-shaped for wire-wrapping, said terminal end of each of said ground sockets is soldered to said ground structure, said receptacle ends of said conductive sockets and said ground sockets are countersunk in relation to said front face, and said protector apparatus includes means for mounting said panel to said frame.

7. The terminal apparatus in accordance with claim 6 further including:

a plurality of retainers being snap-mounted on said main frame, each of said retainers comprising:
a semicircular well, and
a laterally disposed finger having a hooked end; and wherein said mounting means includes a pair of laterally protruding hubs, each of said hubs being affixed to the edge of said panel and seated in said well of a first one of said retainers, and with said front face being secured by said hooked end of another of said retainers vertically above said first one of said retainers.

8. The terminal apparatus in accordance with claim 4 further including a device, mounted on said front face, for electrically interconnecting said receptacle ends of said sockets in said pair of outside plant apertures to said receptacle ends of said sockets in a preselected pair of said central office equipment apertures.

9. The terminal apparatus in accordance with claim 5 further including a protector device, mounted on said front face, for electrically jumpering said receptacle ends of said sockets in said pair of outside plant apertures to said receptacle ends of said sockets in a preselected pair of said central office equipment apertures, said protector device adapted for protecting said wires and said leads against excessive voltage and current by diverting said excessive voltage and current to said ground structure.

10. The terminal apparatus in accordance with claim 9 wherein said protector device further includes means for electrical test accessing said wires associated with said protector device.

11. The device in accordance with claim 10 wherein said conductive sockets mounted in said pair of outside plant apertures includes means for detent positioning said protector device.

12. Main frame apparatus for interconnecting outside plant wires terminating in a first connector with preselected central office equipment leads characterized by insulative means having a plurality of first and second apertures, electrically conductive receptacles mounted in said apertures, retainer means mounted on said insulative means, a second connector, mounted in said retainer means, for receiving said first connector, means for electrically interconnecting said receptacle means mounted in said plurality of first apertures to said second connector, and wherein said leads terminate on said receptacle means mounted in said plurality of said second apertures.

13. Main frame apparatus for interconnecting outside plant wires terminating in a first connector with preselected central office equipment leads characterized by a panel having a front face, a back face and groups of apertures disposed between said front face and said back face, each said group including a pair of outside plant apertures and a pair of central office equipment apertures, electrically conductive sockets mounted in said apertures, each of said sockets having a receptacle end and a terminal end, a bracket having means for mounting said bracket on said back face and including at least one retainer pair, each retainer of said pair disposed on oppositely-faced edges of said bracket, a second connector, adapted to mount in said at least one retainer pair, for receiving said first connector, means for electrically interconnecting said terminal ends of said sockets mounted in said pair of outside plant apertures, and wherein said leads terminate on said terminal ends of said sockets mounted in said plurality of said central office equipment apertures.

14. The frame apparatus in accordance with claim 13 wherein each of said groups of apertures further includes a ground aperture, and said apparatus further comprises ground sockets mounted in said ground apertures, each of said ground sockets having a receptacle end and a terminal end, and a ground structure mounted on said back face and electrically connected to each said terminal end of said ground sockets.

15. The apparatus in accordance with claim 13 further including a device, mounted on said front face, for electrically interconnecting said receptacle ends of said sockets in said pair of outside plant apertures to said receptacle ends of said sockets in a preselected pair of said central office equipment apertures.

16. The apparatus in accordance with claim 14 further including a protector device, mounted on said front face, for electrically jumpering said receptacle ends of said sockets in said pair of outside plant apertures to said receptacle ends of said sockets in a preselected pair of said central office equipment apertures, said protector device adapted for protecting said wires and said leads against excessive voltage and current by diverting said excessive voltage and current to said ground structure.

17. The apparatus in accordance with claim 16 wherein said protector device further includes means for electrical test accessing said wires associated with said protector device.

18. The device in accordance with claim 17 wherein said conductive sockets mounted in said pair of outside plant apertures includes means for detent positioning said protector device.

* * * * *

UNITED STATES PATENT AND TRADEMARK OFFICE
CERTIFICATE OF CORRECTION

PATENT NO. : 4,273,966
DATED : June 16, 1981
INVENTOR(S) : Paul R. Briggs, Jr., and Louis J. Scerbo It is certified that error appears in the above—identified patent and that said Letters Patent is hereby corrected as shown below:

Column 1, line 14, "centrl" should read --central. Column 3, line 29, "facilatated" should read --facilitated--. Column 4, line 38, "cabe" should read --cable--. Column 5, line 45 "similar" should read --smaller--.

Signed and Sealed this

Twenty-sixth Day of April 1983

[SEAL]

Attest:

GERALD J. MOSSINGHOFF

Attesting Officer   Commissioner of Patents and Trademarks